(12) United States Patent
Sugihara et al.

(10) Patent No.: US 6,475,111 B2
(45) Date of Patent: Nov. 5, 2002

(54) TOROIDAL CONTINUOUSLY VARIABLE TRANSMISSION

(75) Inventors: Jun Sugihara; Toshikazu Oshidari; Tsutomu Yamazaki, all of Yokosuka; Haruhito Mori, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 88 days.

(21) Appl. No.: 09/731,985

(22) Filed: Dec. 8, 2000

(65) Prior Publication Data
US 2001/0018383 A1 Aug. 30, 2001

(30) Foreign Application Priority Data

Dec. 9, 1999 (JP) ............................. 11-350007
Nov. 1, 2000 (JP) ........................ 2000-334785

(51) Int. Cl.[7] ............................................. F16H 15/38
(52) U.S. Cl. ........................................... 476/46; 476/40
(58) Field of Search ............................. 476/40, 41, 42, 476/45, 46

(56) References Cited

U.S. PATENT DOCUMENTS 3,486,391 A * 12/1969 Kraus .......................... 476/46
6,328,669 B1 * 12/2001 Imanishi et al. ............... 476/40
6,332,858 B1 * 12/2001 Mori et al. .................... 476/46

FOREIGN PATENT DOCUMENTS

JP 7-198014 8/1995
JP 11-159590 6/1999

* cited by examiner

Primary Examiner—William C Joyce
(74) Attorney, Agent, or Firm—Foley & Lardner

(57) ABSTRACT

A power roller (18c) comprises a power roller inner wheel (93) in frictional contact with a input/output disks (18a, 18b), a power roller outer wheel (94) provided in a trunnion (17a), a ball bearing (92) interposed between the power roller inner wheel (93) and the power roller outer wheel (94), and an inner wheel supporting shaft (95) which supports the power roller inner wheel (93) such that it is free to rotate, the shaft having a shaft base part (95b) supported in the trunnion (17a), and arranged so that the radial support rigidity is set high in a gyration axis direction and set low in the direction perpendicular to the trunnion gyration axis (19a) and the power roller rotation axis (15d). When one of the disks is pressed and displaced in the direction of the other disk by the press member, the power roller inner wheel (93) displaces with the ball bearing (92) by the displacement of the one of the disks Therefore, as the radial support rigidity of the inner wheel supporting shaft (95) is different depending on the support direction, a slide function of the power roller (18c) can be provided by a simple structure having a small number of component parts which does not have a slide mechanism.

14 Claims, 9 Drawing Sheets (SECTION D-D)

(SECTION E-E)

TOROIDAL CONTINUOUSLY VARIABLE TRANSMISSION

FIELD OF THE INVENTION

This invention relates to a toroidal continuously variable transmission.

BACKGROUND OF THE INVENTION

Tokkai Hei 7-198014 published by the Japanese Patent Office in 1995 and Tokkai Hei 11-159590 published by the Japanese Patent Office in 1999, disclose a toroidal continuously variable transmission. Tokkai Hei 11-159590 describes a power roller supporting mechanism which can pivot. On the other hand, Tokkai Hei 7-198014 describes a power roller supporting mechanism which does not use an eccentric shaft.

SUMMARY OF THE INVENTION

However, there was the following problem in the prior art power roller supporting mechanism.

In the structure described in Tokkai Hei 11-159590, an eccentric axis is supported so that it can rotate relative to a trunnion, and a rotation axis on the trunnion side and the rotation axis on the power roller side of the eccentric shaft are offset. This offset is used as a power roller gyration mechanism. The offset amount is equivalent to a pivot arm length. Due to this gyration mechanism, the number of component parts is large, and cost is high.

A gap is formed between the eccentric shaft and the trunnion, and between the eccentric shaft and a inner wheel of the power roller. As a result of this gap, due to the fluctuation of a force in a tangential direction received by the power roller inner wheel from the input/output disks, a position of the power roller relative to the trunnion in a gyration axis direction varies, and a torque shift therefore occurs. At this time, an outer wheel of the power roller engages with the eccentric shaft, so displacement of the eccentric shaft is suppressed. The eccentric shaft inclines relative to the gyration axis, however as the power roller outer wheel is pushed against the trunnion by a thrust force due to the power roller inner wheel, it remains parallel to the gyration axis. Therefore, due to the inclination of the eccentric shaft, when the eccentric shaft engages with a hole on the power roller outer wheel, it engages while center lines are offset relative to each other, and there is a risk that an edges of an engaging hole will deform or wear down.

This deformation or wear causes a time-dependent variation in the ease with which the eccentric shaft inclines, i.e., a time-dependent variation in torque shift characteristics. This time-dependent variation is undesirable from a viewpoint of speed ratio control of the vehicle.

If the power roller outer wheel is made to fit loosely with the eccentric shaft to prevent this time-dependent variation (if the gap is set large), a torque shift amount increases which is also undesirable for speed ratio control of the vehicle.

Torque shift is a phenomenon wherein a real speed ratio varies from a target speed ratio determined based on vehicle running conditions according to an input torque.

In the structure described in Tokkai Hei 7-198014, a needle bearing is interposed between the power roller housing of the trunnion and the power roller outer wheel, and this is used as a slide mechanism of the power roller inner wheel. Therefore, the number of component parts is large and cost increases due to the use of this slide mechanism.

It is therefore an object of this invention to provide a toroidal continuously variable transmission having a power roller supporting structure which maintains a required power roller slide function or gyration function, and eliminates the problem of rigidity inherent in transmissions without an eccentric shaft or torque shift problems inherent in transmissions with an eccentric shaft, by a simple structure with a small number of component parts.

In order to achieve above object, this invention provides a toroidal continuously variable transmission comprising: an input disk and an output disk disposed facing each other on a common axis, power rollers provided so that it can transmit power between these input/output disks, press member disposed at a rear of one of the input disk and output disk which presses in the direction of the other disk, and trunnions which support the power roller free to rotate and is able to gyrate around a gyration axis perpendicular to a rotation axis of the power roller, wherein the trunnions support the power rollers, so that they support a thrust force acting in the power rollers rotation axis direction and a traction force acting in the gyration axis direction ,the each of power rollers comprise a power roller inner wheel in frictional contact with the input/output disks, a power roller outer wheel supported in the trunnion, a ball bearing interposed between the power roller inner wheel and the power roller outer wheel , and an inner wheel supporting shaft which supports the power roller inner wheel such that it is free to rotate, the shaft having a shaft base part provided in the trunnion , and arranged so that the radial support rigidity is set high in the gyration axis direction and set low in the direction perpendicular to the trunnion gyration axis and the power roller rotation axis, and when one of the disks is pressed and displaced in the direction of the other disk by a press member , the power roller inner wheel displaces with the ball bearing by the displacement of the one of the disks.

DESCRIPTION OF THE PREFERRED EMBODIMENTS

Figure 1:
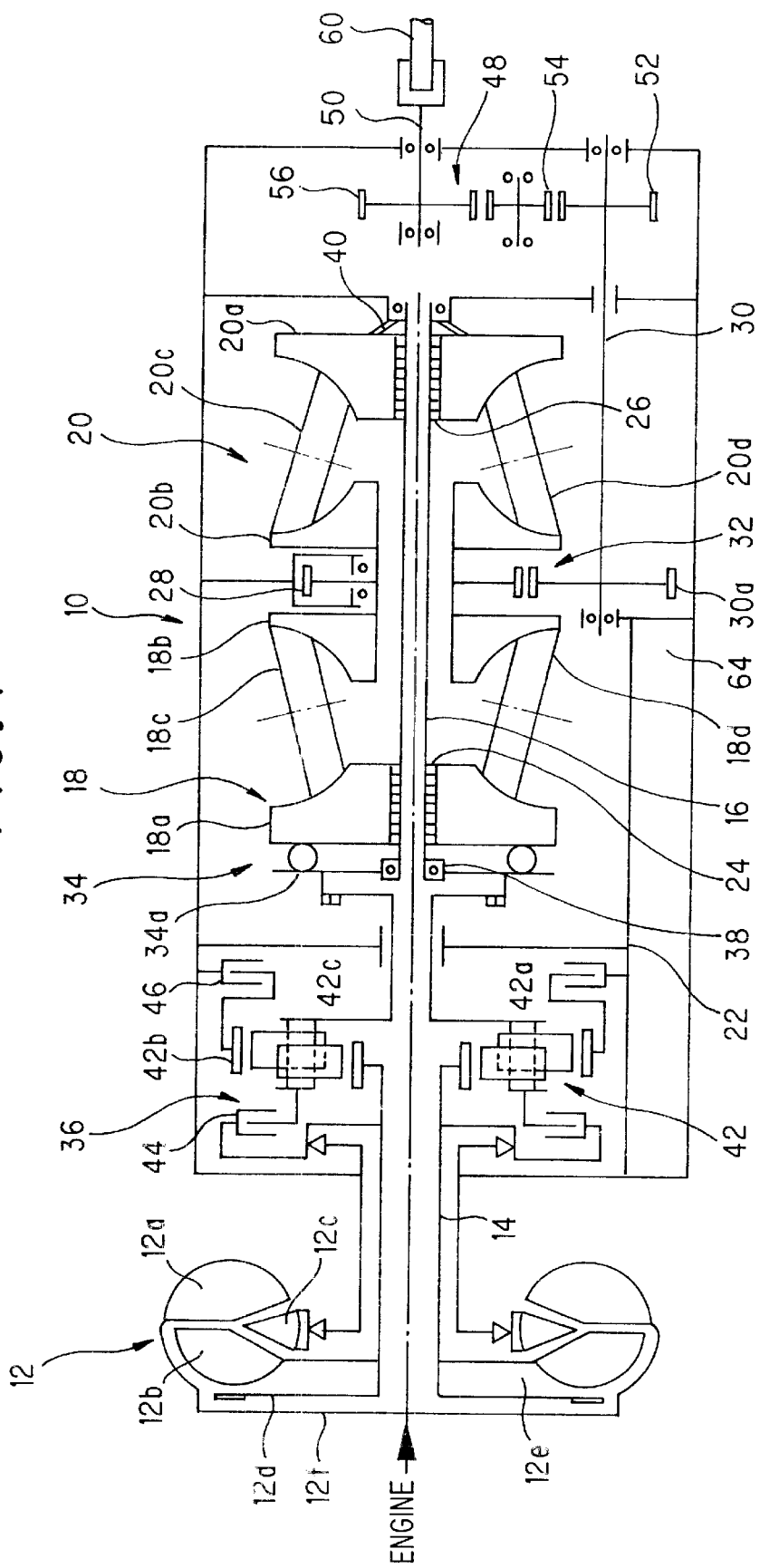
FIG. 1 is an overall system diagram showing a toroidal continuously variable transmission according to this invention.

FIG. 1 is an overall view showing a toroidal continuously variable transmission according to a first embodiment. 10 shows the toroidal continuously variable transmission, and a rotation drive force is input from an engine, not shown, via a torque converter 12. The torque converter 12 comprises a pump impeller 12a, turbine runner 12b, stator 12c, lock-up clutch 12d, apply side oil chamber 12e and release side oil chamber 12f, and an impeller shaft 14 passes through its center.

The impeller shaft 14 is connected to a forward/reverse change-over mechanism 36. The forward/reverse change-over mechanism 36 comprises a planetary gear set 42, forward clutch 44 and reverse clutch 46. The planetary gear set 42 comprises a pinion carrier 42a supporting a double pinion, and a ring gear 42b and sun gear 42c which respectively mesh with the double pinion.

The pinion carrier 42a of the planetary gear set 42 is connected to a torque transmission shaft 16. A first continuously variable transmission 18 and second continuously variable transmission 20 are arranged downstream in tandem fashion in a transmission case 22 on the torque transmission shaft 16. A control valve body is disposed in a base shown by the symbol 64.

Figure 2:
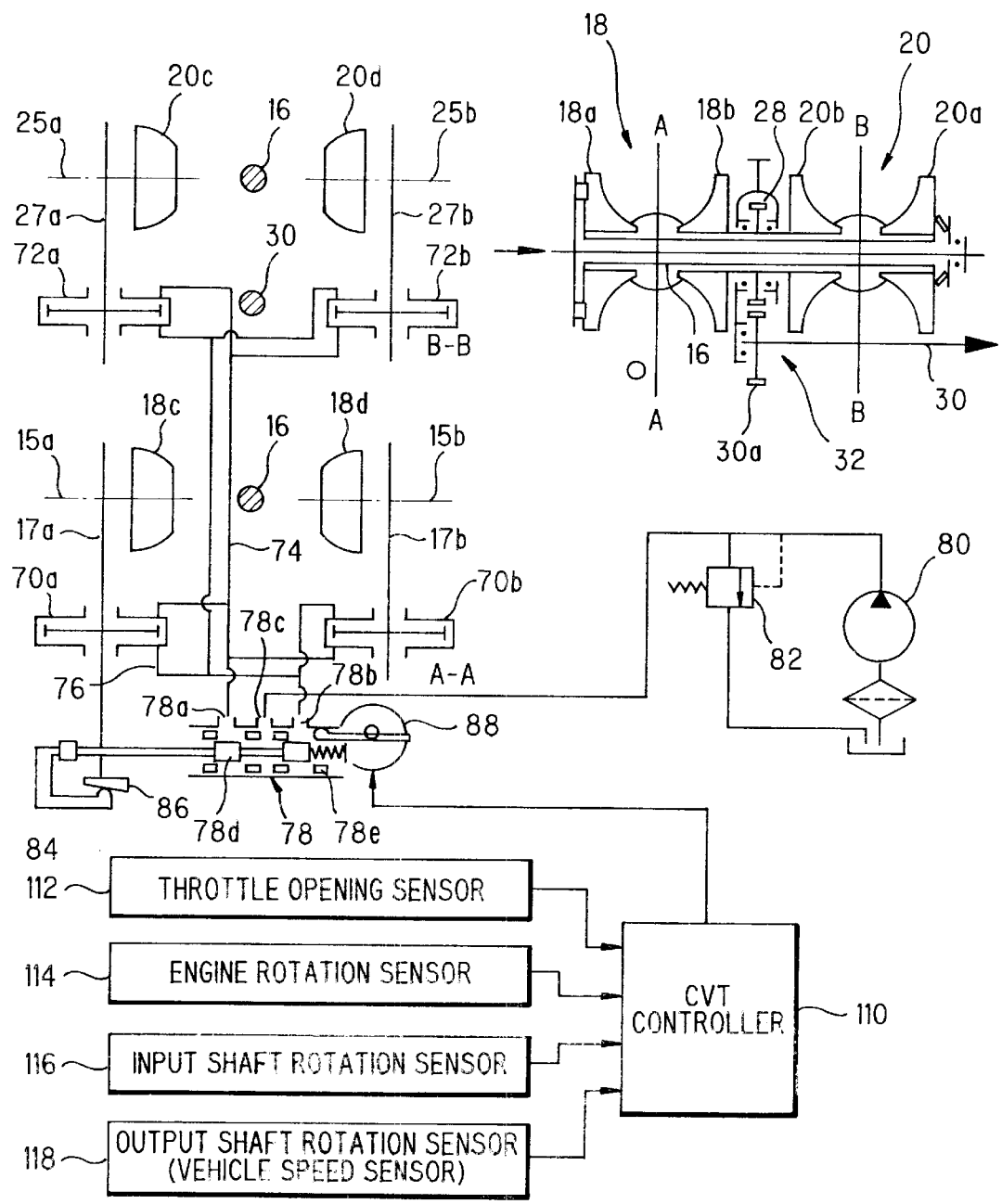
FIG. 2 is a speed ratio control system diagram showing the toroidal continuously variable transmission according to this invention.

Referring to FIG. 2, the first continuously variable transmission 18 is provided with an input disk 18a and an output disk 18b, a pair of power rollers 18c, 18d, a supporting member which supports the power rollers 18c, 18d so that they can both gyrate, and servopistons which function as oil pressure actuators. The input disk 18a and output disk 18b are formed so that their opposite surfaces are toroidal curved surfaces. The pair of power rollers 18c, 18d are gripped between the opposite surfaces of the input/output disks 18a, 18b and are symmetrically disposed relative to the torque transmission shaft 16.

The second continuously variable transmission 20 is likewise provided with an input disk 20a and an output disk 20b whereof the opposite surfaces are formed as toroidal curved surfaces, a pair of power rollers 20c, 20d, a supporting member and servopistons.

The continuously variable transmissions 18, 20 are disposed in opposite directions so that the output disks 18b, 20b face each other on the torque transmission shaft 16. The input disks 18a, 20a of the first continuously variable transmission 18 are pushed to the right in the axial direction of the figure by a loading cam mechanism 34 which generates a pressing force according to the input torque via the torque converter 12.

The loading cam mechanism 34 comprises a loading cam 34a, and is supported by the torque transmission shaft 16 via a bearing 38. The input disk 18a of the first continuously variable transmission 18 and the input disk 20a of the second continuously variable transmission 20 are pushed to the left in the axial direction of the figure by a plate spring 40. The loading cam mechanism 34 and plate spring 40 correspond to the press member described in the claims.

The input disks 18a, 20a are supported free to rotate and free to displace in an axial direction by the transmission shaft 16 via ball splines 24, 26.

In the above mechanism, the power rollers 20c, 20d respectively gyrate to give gyration angles corresponding to a speed ratio by an action which is described later, and the input rotation of the input disks 18a, 20a is continuously varied by the power rollers 20c, 20d and transmitted to the output disks 18b, 20b by the power rollers 20c, 20d.

The output disks 18b, 20b are spline jointed with an output gear 28 which engages with the torque transmission shaft 16 so that the output gear 28 can perform relative rotation on the torque transmission shaft 16. The transmitted torque is transmitted to a gear 30a joined to an output shaft 30 via the output gear 28, these gears 28, 30a are forming a torque transmission mechanism 32. A transmission mechanism 48 comprising gears 52, 56 on the output shafts 30, 50 and idler gears 54 which respectively mesh with these gears 52, 56, is also provided. The output shaft 50 connects the transmission mechanism 48 to a propeller shaft 60.

Referring to FIG. 2, the speed ratio control system will be described wherein the aforesaid power rollers 18c, 18d, 20c, 20d are respectively caused to gyrate so as to obtain gyration angles according to the speed ratio.

First, the power rollers 18c, 18d, 20c, 20d are supported free to rotate around power roller rotation axes 15a, 15b, 25a, 25b at one end of trunnions 17a, 17b, 27a, 27b. Servopistons 70a, 70b, 72a, 72b which function as oil pressure actuators, which displace the trunnions 17a, 17b, 27a, 27b in an axial direction and cause the power rollers 18c, 18d, 20c, 20d to gyrate, are provided at the other end of the trunnions 17a, 17b, 27a, 27b.

An oil pressure control system which controls the action of the servo pistons 70a, 70b, 72a, 72b comprises a high side oil passage 74 connected to a high side oil chamber, a low side oil passage 76 connected to a low side oil chamber, and a speed ratio control valve 78 comprising a port 78a connecting the high side oil passage 74 and the low side oil passage 76. A line pressure from the oil pressure source comprising an oil pump 80 and relief valve 82 is supplied to a line pressure port 78c of the speed ratio control valve 78. A speed change spool 78d of the speed ratio control valve 78 detects the axial direction and gyration direction of the trunnion 17a, and operates in synchronism with a lever 84 and precess cam 86 which feeds these back to the speed ratio control valve 78. A speed change sleeve 78e of the speed ratio control valve 78 is driven so as to be displaced in an axial direction by a step motor 88.

A CVT controller 110 is provided as an electronic control system which drives and controls the step motor 88. Input information from a throttle opening sensor 112, engine rotation sensor 114, input shaft rotation sensor 116 and output shaft rotation sensor (vehicle speed sensor) 118 is input to this CVT controller 110.

The aforesaid power rollers 18c, 18d, 20c, 20d have an identical supporting structure. Here, the supporting structure of the power roller 18c will be described referring to FIG. 3–FIG. 6.

Figure 3:
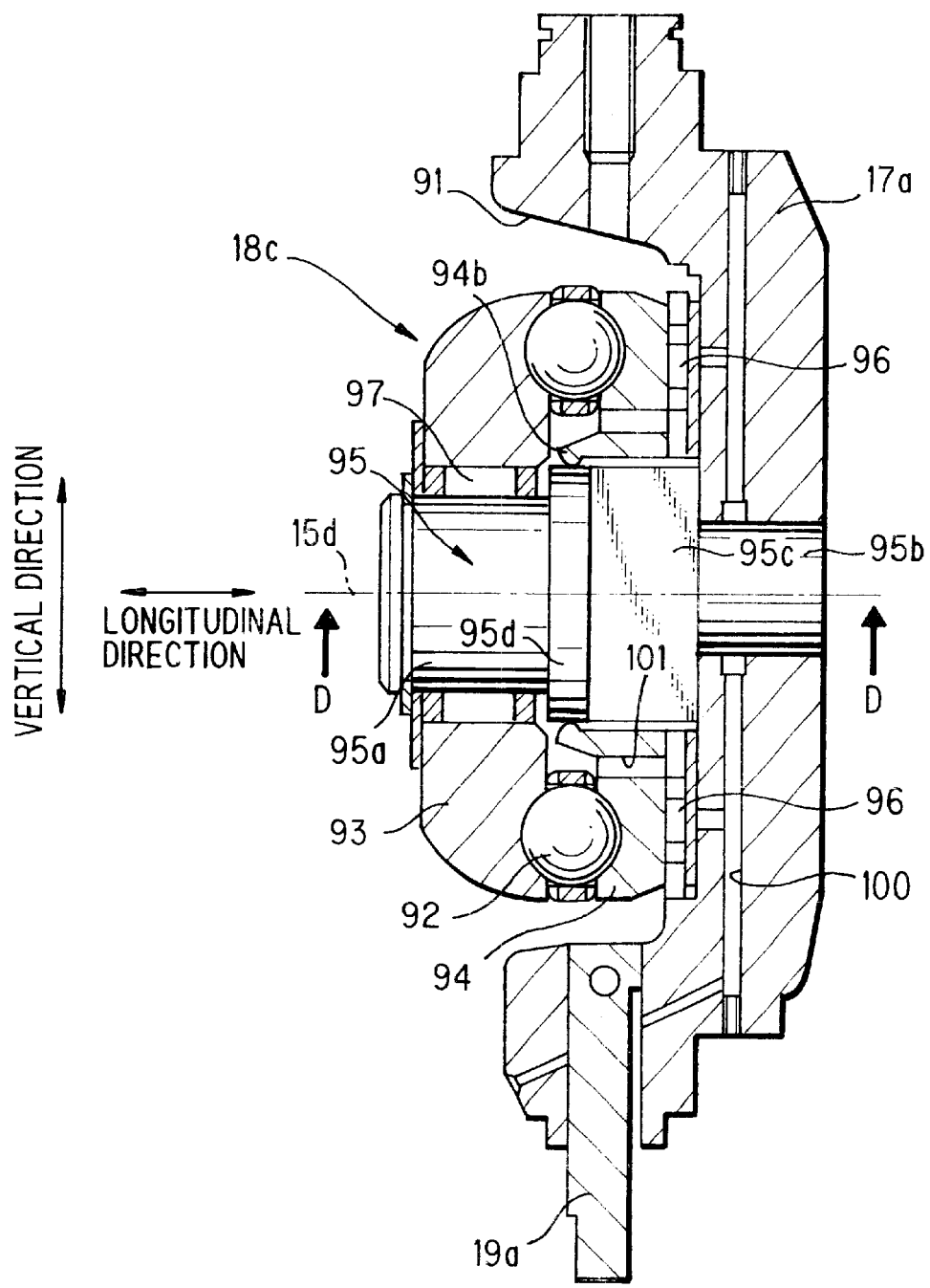
FIG. 3 is showing the power roller supporting structure in a embodiment according to this invention.
Figure 4:
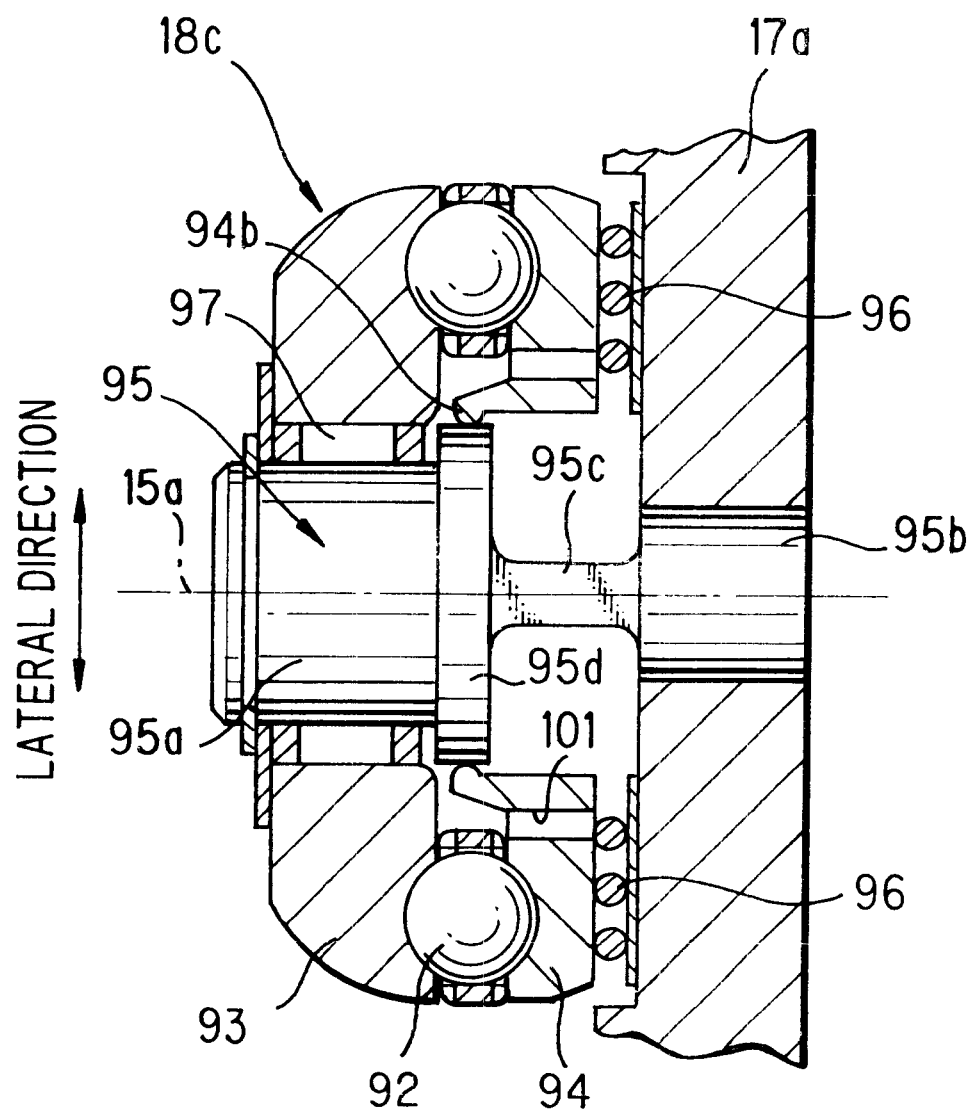
FIG. 4 is a cross-sectional view through a line D—D in FIG. 3 showing the power roller supporting structure according to the embodiment.

The power roller supporting structure will now be described referring to FIG. 3 and FIG. 4. A power roller housing unit 91 is formed as a depression at one end of the trunnion 17a, and the power roller 18c is supported at the position of the power roller housing unit 91. The trunnion 17a can gyrate around a pivot axis 19a perpendicular to the power roller rotation axis 15a.

The power roller 18c comprises a power roller inner wheel 93, a power roller outer wheel 94, and a ball bearing 92 interposed between the power roller inner wheel 93 and the power roller outer wheel 94. The power roller inner wheel 93 is in frictional contact with the input/output disks 18a, 18b, and is supported free to rotate via a roller bearing 97 relative to an inner wheel supporting shaft 95. The power roller outer wheel 94 is supported so that it can move smoothly in the direction perpendicular to the trunnion gyration axis and the power roller rotation axis via a needle bearing 96 relative to the trunnion 17a.

The inner wheel supporting shaft 95 comprises a shaft tip part 95a supporting the power roller inner wheel 93, a base part 95b formed into one piece by press-fixing to the trunnion 17a, an intermediate shaft part 95c between the axial tip part 95a and base part 95b, and supporting shaft part 95d. By making the width of the intermediate shaft part 95c in the direction perpendicular to the trunnion gyration axis and the power roller rotation axis narrow as shown in FIG. 4, the radial rigidity is set high in a gyration axis direction perpendicular to a rotation axis of the power roller and low in the direction perpendicular to the trunnion gyration axis and the power roller rotation axis.

An arc-shaped part 94b formed on the inside surface of the power roller outer wheel 94 comes in contact with the supporting axial part 95d, and the tip-over base position of the inner wheel supporting shaft 95 is set on the side of the power roller inner wheel 93. In this way, tip-over of the inner wheel supporting shaft 95 when a contact force acts on the power roller inner wheel 93 is suppressed low.

Describing now the bearing lubricating structure, a first lubricating oil supply passage 100 which supplies lubricating oil produced by the oil pressure unit, not shown, is formed in the trunnion 17a. A second lubricating oil supply passage 101 which supplies lubricating oil from the first lubricating oil supply passage 100 to the ball bearing 92 and roller bearing 97 in the power roller, is formed in the power roller outer wheel 94.

Next, the supporting action due to the power roller will be described.

First, a thrust force which acts in the power roller rotation axis direction on the power roller inner wheel 93 due to frictional contact with the input/output disks 18a, 18b is received by the trunnion 17a via the ball bearing 92 and power roller outer wheel 94.

Also, the inner wheel supporting shaft 95 which supports the power roller inner wheel 93 free to rotate is provided in one piece by pressing its base part 95b into the trunnion 17a, and due to the section configuration of the intermediate shaft part 95c the inner wheel supporting shaft 95, the radial rigidity is set high in the gyration axis direction and low in the direction perpendicular to the trunnion gyration axis and the power roller rotation axis. In this way, the traction force acting in the gyration axis direction is received by the inner wheel supporting shaft 95 due to the high rigidity. Further, due to the loading cam mechanism 34 or the plate spring 40, when the input disk 18a exerts a pressing force, i.e., a force in the direction perpendicular to the trunnion gyration axis and the power roller rotation axis, on the output disk 18b, the intermediate shaft part 95c bends and deforms in the direction in which the force acts due to the low rigidity of the intermediate shaft part 95c, and the power roller inner wheel 93 pivots around the base part 95d, i.e., a gyration movement occurs.

Next, the advantages of this arrangement will be described.

(1) By making the radial rigidity of the inner wheel supporting shaft 95 different depending on the direction, the gyration of the power roller 18c can be ensured by means of a simple structure with a small number of component parts which do not have a gyration function.

(2) The base part 95b of the inner wheel supporting shaft 95 is formed in one piece with the trunnion 17a, so there is no gap between the inner wheel supporting part 95 and the trunnion 17a, and the support rigidity in the gyration axis direction of the power roller 18c can be made high. Therefore, even if the force in the direction of the tangent between the input/output disks 18a, 18b and the power roller inner wheel 93, i.e., the vertical force, fluctuates, the displacement of the power roller inner wheel 93 in the gyration axis direction relative to the trunnion 17a is suppressed, and torque shift is largely decreased compared to a power roller supporting structure using a pivot shaft in an eccentric axis structure according to the prior art.

(3) By making the width in the direction perpendicular to the trunnion gyration axis and the power roller rotation axis of the intermediate shaft part 95c of the inner wheel supporting shaft 95 narrow, the radial rigidity in the gyration axis direction can be set high, and the radial rigidity in the direction perpendicular to the trunnion gyration axis and the power roller rotation axis can be set low. Therefore, the radial rigidity of the inner wheel supporting shaft 95 can be set different in the gyration axis direction and the rotation axis direction of the disks by means of a simple structure merely by making the width of the intermediate shaft part 95c in the direction perpendicular to the trunnion gyration axis and the power roller rotation axis narrow.

The inner wheel supporting shaft 95 may be fixed to the trunnion 17a by a method other than pressing, for example it may be fixed by welding or screwing. Also, the inner wheel supporting shaft 95 may be formed in one piece with the trunnion 17a, in which case the number of component parts can be reduced.

Figure 5:
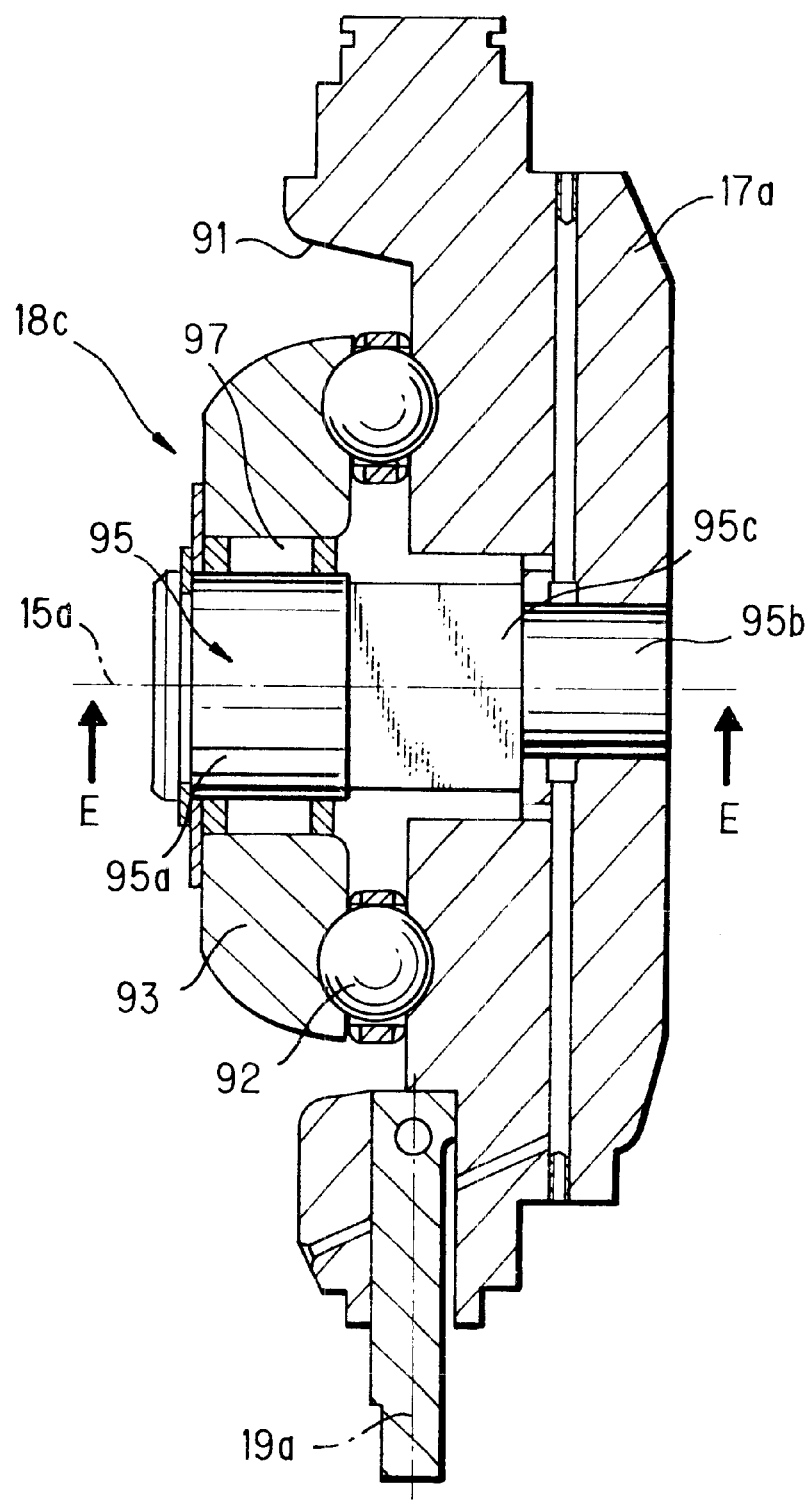
FIG. 5 is a cross-sectional view through a line D—D in FIG. 3 showing the power roller supporting structure according to a second embodiment of this invention.
Figure 6:
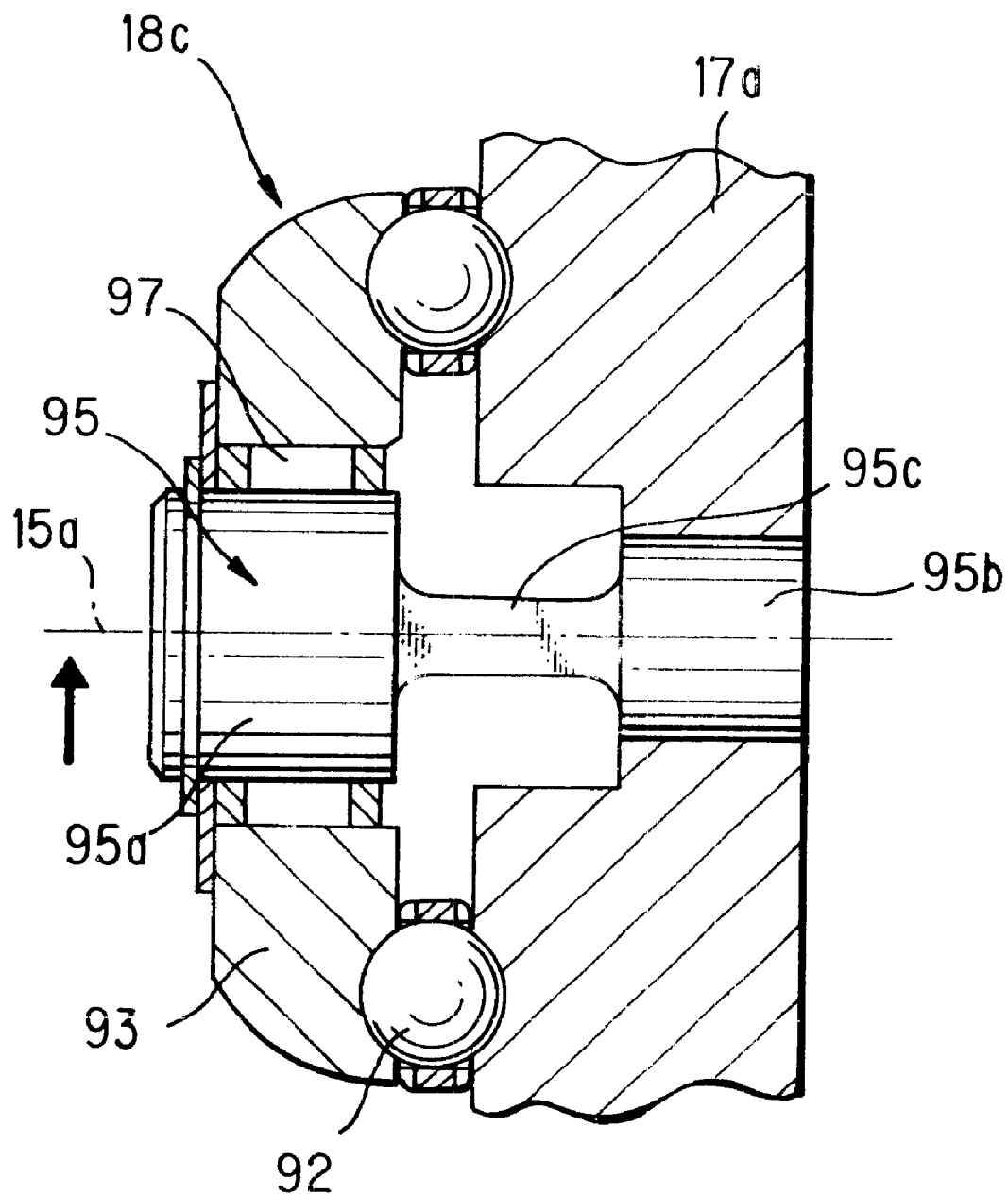
FIG. 6 is a cross-sectional view through a line E—E in FIG. 5 showing the power roller supporting structure according to the second embodiment.

A second embodiment of the power roller supporting structure will now be described referring to FIG. 5 and FIG. 6. In this embodiment, the power roller outer wheel 94 of the power roller supporting structure of the first embodiment is omitted, and the trunnion 17a is formed as a one-piece moulded part comprising a part corresponding to the power roller outer wheel.

The remaining features of the structure are identical to those of the first embodiment, and their description will be omitted.

In this second embodiment, by forming the power roller outer wheel and power roller supporting member as the trunnion 17a which is moulded in one piece, the number component parts is further reduced compared to the first embodiment which is advantageous from the viewpoint of cost.

Specifically, in the power roller supporting structure using the inner wheel supporting shaft 95, the power roller outer wheel 94 is mainly the component which receives the thrust force acting on the ball bearing 92, and in this point it is not functionally different from a power roller supporting member.

The power roller outer wheel 94 may be fixed by pressing into the trunnion 17a, and the power roller outer wheel 94 and trunnion 17a may be formed in one piece.

A third embodiment of the power roller supporting structure will now be described referring to FIG. 7 and FIG. 8. In the figure, 17a is the trunnion, 18c is the power roller, 92 is the ball bearing, 93 is the power roller inner wheel, 95 is the inner wheel supporting shaft, 97 is the roller bearing, 100 is the first lubricating oil passage, 105 is a lubricating oil supply pipe and 106 is a pipe fitting hole.

Figure 9:
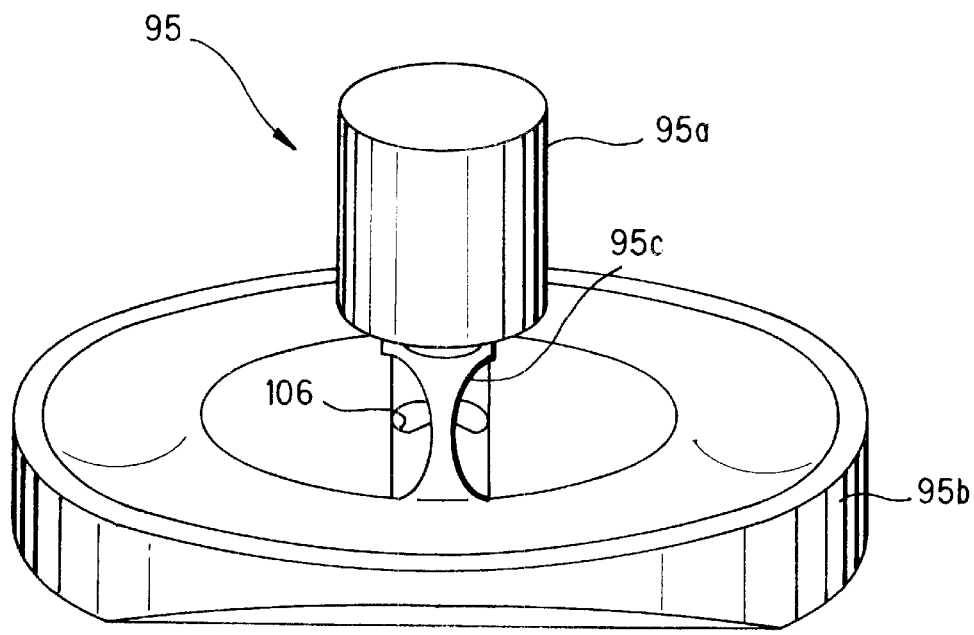
FIG. 9 is a perspective view showing an inner wheel supporting axis in the power roller supporting structure according to the third embodiment.

The inner wheel supporting shaft 95 structure will now be described referring to FIG. 9 and FIG. 11. The inner wheel supporting shaft 95 comprises the shaft part 95*a* which supports the power roller inner wheel 93, the base part 95*b* which is formed in one piece with the power roller outer wheel, and the intermediate shaft part 95*c* between the shaft tip part 95*a* and base part 95*b*. By making the width of the intermediate shaft 95*c* in the direction perpendicular to the trunnion gyration axis and the power roller rotation axis narrow, the radial rigidity can be set high in the gyration axis direction and set low in the direction perpendicular to the trunnion gyration axis and the power roller rotation axis. Further, due to the pressing force of the input/output disks 18*a*, 18*b* which increases with increase of input torque, the power roller inner wheel 93 tracks while remaining in contact with the input/output disks 18*a*, 18*b*.

By giving the intermediate shaft part 95*c* of the inner wheel supporting shaft 95 a shape determined by the following items, the intermediate shaft part 95*c* is made to deform easily in the direction perpendicular to the trunnion gyration axis and the power roller rotation axis while maintaining rigidity in the gyration axis direction of the intermediate shaft part 95*c*. It should be noted that deformation of the intermediate shaft part 95*c* in the direction perpendicular to the trunnion gyration axis and the power roller rotation axis can be obtained provided that at least one of the following conditions is satisfied.

Figure 10:
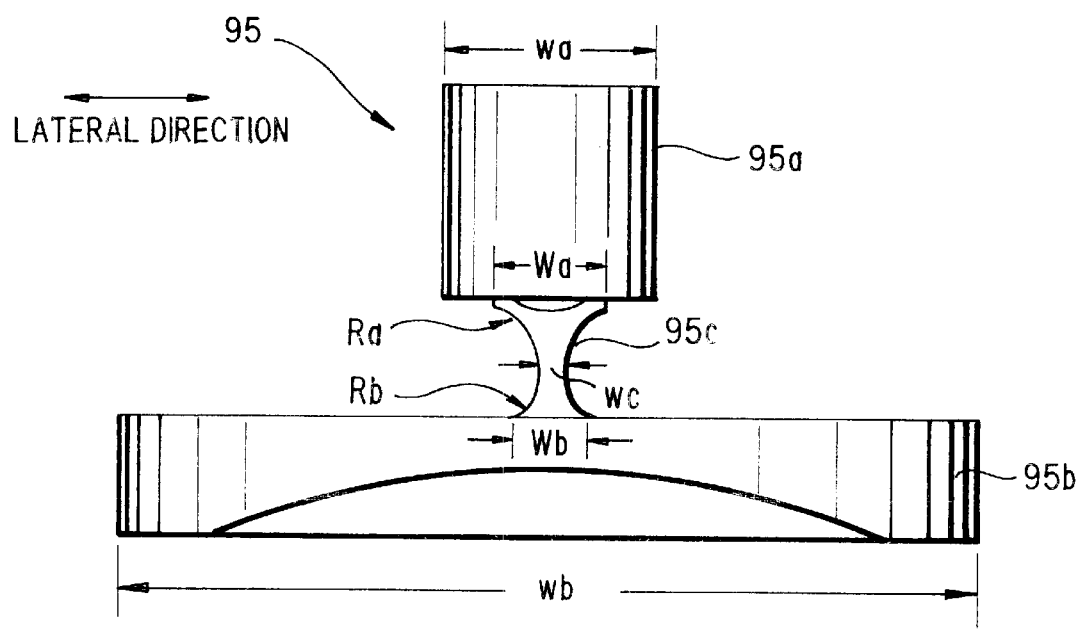
FIG. 10 is left/right lateral views showing the inner wheel supporting axis of the power roller supporting structure according to the third embodiment.
Figure 11:
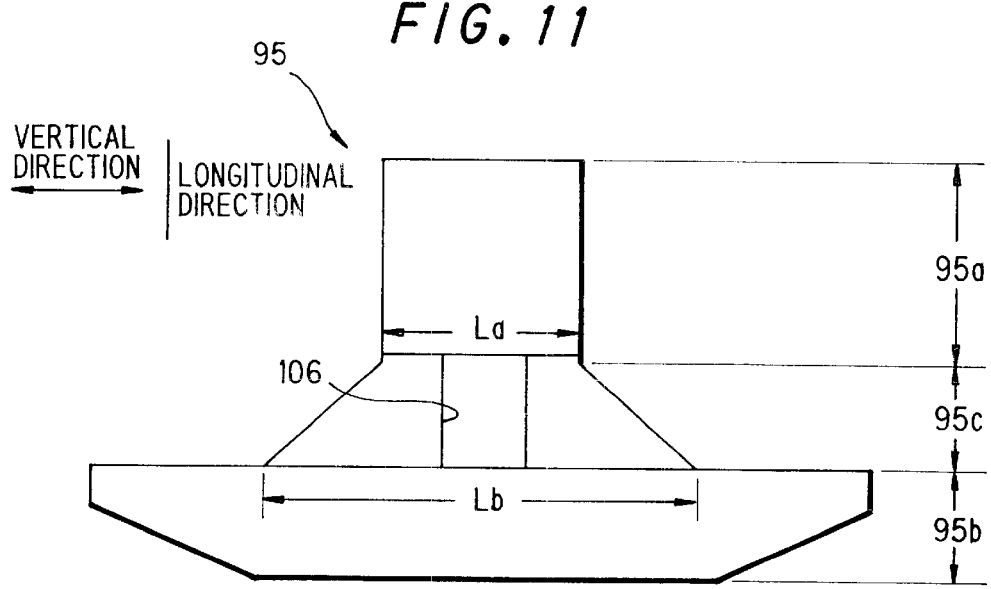
FIG. 11 is top/bottom lateral views showing the inner wheel supporting axis of the power roller supporting structure according to the fourth embodiment.

(1) The up/down length Lb of the join part with the base part 95*b* in the intermediate shaft part 95*c* is set longer than the up/down length La of the join part with the shaft tip part 95*a*, as shown in FIG. 11.
(2) The left/right width Wb of the join part with the base part 95*b* in the intermediate shaft part 95*c* is set narrower than the left/right width Wa of the join part with the shaft tip part 95*a*, as shown in FIG. 10.
(3) The left/right width wc of the intermediate shaft part 95*c* is set narrower than the left/right widths wb, wa of the base part 95*b* and shaft tip part 95*a*, as shown in FIG. 10.
(4) The curvature radius Rb of the join part of the base part 95*b* and intermediate shaft part 95*c*, is set smaller than the curvature radius Ra of the join part of the shaft tip part 95*a* and intermediate shaft part 95*c*, as shown in FIG. 10.
(5) A pipe fitting hole 106 (hole part) is provided in the axis direction in the intermediate shaft part 95*c*, as shown in FIG. 11.

The motion of the base part 95*b* of the aforesaid inner wheel supporting shaft 95 relative to the trunnion 17*a* is restricted in the gyration axis direction by a tape fitting (tape sliding part A), and the motion is not restricted in the direction perpendicular to the trunnion gyration axis and the power roller rotation axis.

Figure 12:
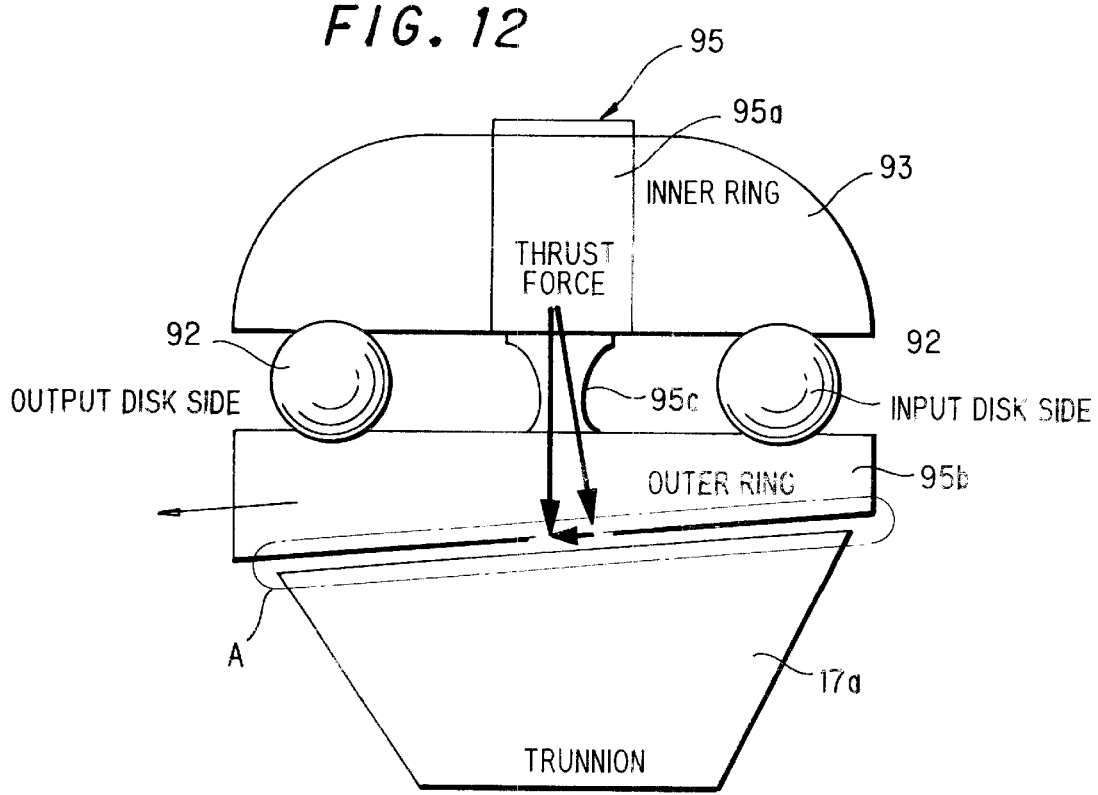
FIG. 12 is a diagram describing the action when the power roller and a trunnion are attached to a unit in the power roller supporting structure according to the fourth embodiment.

Further, as shown in FIG. 12, the tape sliding part A is set to have a small inclination angle so that, when the force of the loading cam mechanism 34 is input, the base part 95*b* of the inner wheel supporting shaft 95 receives a thrust in the direction of the output disk 18*b* on the opposite side to the input disk 18*a* to which the pressing force is input.

An oil passage for lubricating the roller bearing 97 interposed between the power roller inner wheel 93 and inner wheel supporting shaft 95 comprises a lubricating oil supply pipe 105 which is a different component from the trunnion 17*a* and inner wheel supporting shaft 95. There is a gap t between the lubricating oil supply pipe 105 and the first lubricating oil passage 100 provided in the trunnion 17*a*, and the lubricating oil supply pipe 105 is supported by the base part 95*b* of the inner wheel supporting shaft 95 and the shaft tip part 95*a* of the inner wheel supporting shaft 95. The lubricating oil supply pipe 105 may also be supported by the trunnion 17*a* and the shaft tip part 95*a* of the inner wheel supporting shaft 95.

Figure 7:
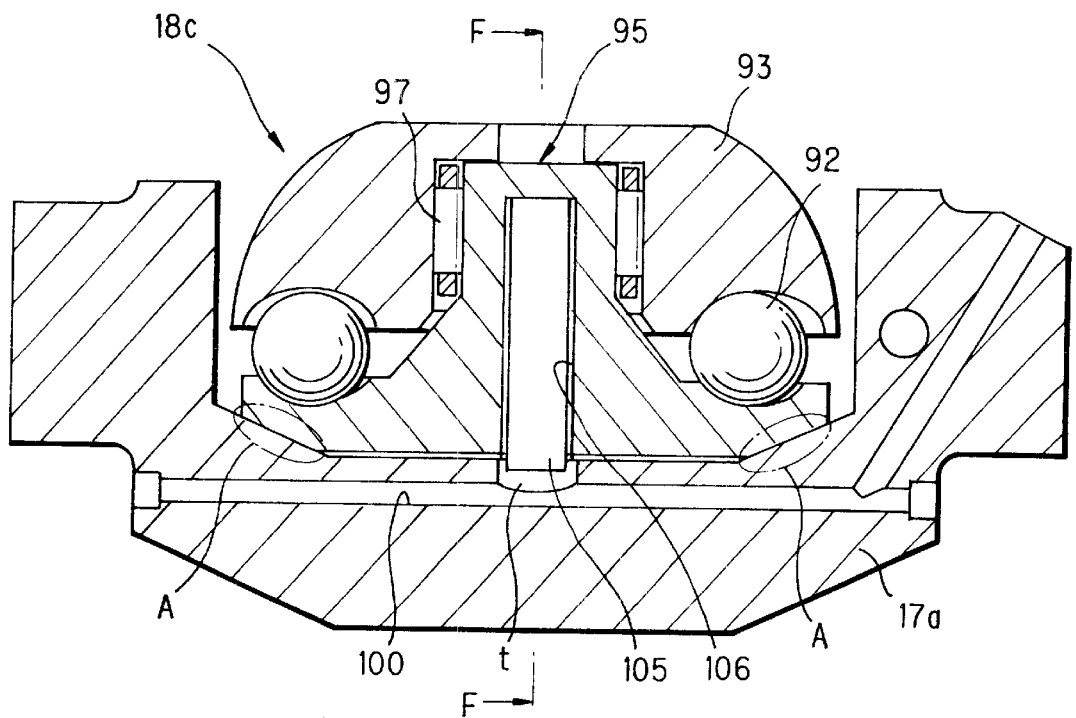
FIG. 7 is similar to FIG. 3, but showing the power roller supporting structure according to a fourth embodiment of this invention.
Figure 8:
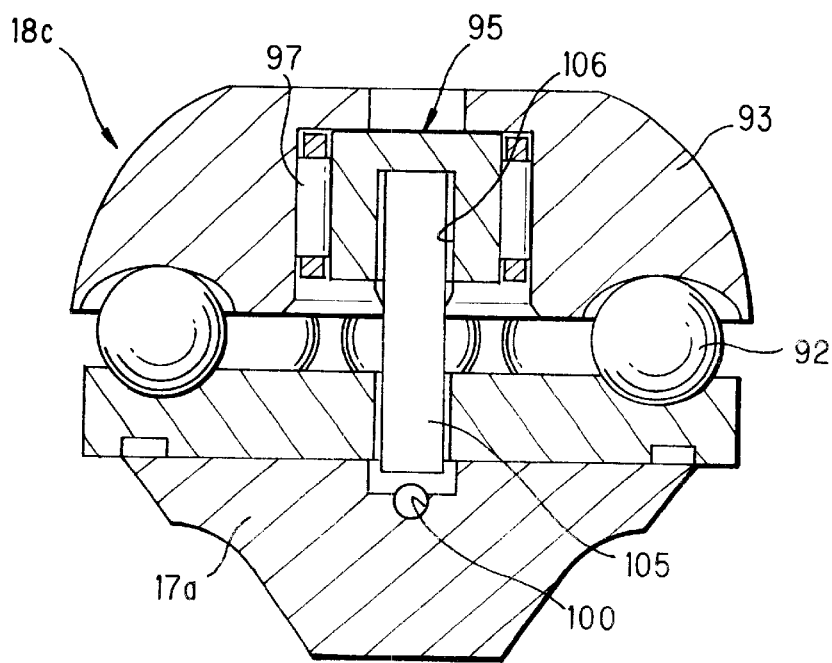
FIG. 8 is a cross-sectional view through a line F—F in FIG. 7 showing the power roller supporting structure according to the third embodiment.

The intermediate shaft part 95*c* of the inner wheel supporting shaft 95 has a trapezoidal shape which progressively widens from the thickness Wa to Wb in the gyration axis direction so that the roller bearing 97 interposed between the power roller inner wheel 93 and inner wheel supporting shaft 95 does not fall out, as shown in FIG. 7 and FIG. 11.

Next, the action of this device will be described.

When the vehicle is running, if the input torque from the engine is increased, the loading cam mechanism 34 generates a pressing force so as to generate the normal force required for power transmission. Due to this force, components such as the input/output disks 18*a*, 18*b*, trunnion 17*a* and ring deform. At this time, the trunnion 17 is effectively fixed in order to generate a pressing force between the power roller 93 and the output disk 18*b* equal to that between the power roller 93 and input disk 18*a*, so the power roller 93 must be able to move towards the output disk 18*b* relative to the trunnion 17*a*.

According to the third embodiment, to displace the power roller 93 towards the output disk 18*b*, the intermediate shaft part 95*c* of the inner wheel supporting shaft 95 supporting the power roller 93 deforms in the direction perpendicular to the trunnion gyration axis and the power roller rotation axis. However, a traction force is generated in the gyration axis direction, so the gyration axis direction rigidity of the intermediate shaft part 95*c* is maintained at a high level.

Regarding the shape in the direction perpendicular to the trunnion gyration axis and the power roller rotation axis of the intermediate shaft part 95*c* which is a low rigidity part, the left/right width of the intermediate shaft part 95*c* is narrower than the left/right width of the shaft tip part 95*a* or base part 95*b*, as shown in FIG. 10. Further, the shaft tip part 95*a* comes in contact with the join part of the base part 95*b* on a curved surface. By making the width wc in the vicinity of the center of the intermediate shaft part 95*c* narrowest, the rigidity in the direction perpendicular to the trunnion gyration axis and the power roller rotation axis is decreased and the required amount of deformation is obtained.

Regarding the up/down shape of this intermediate shaft part 95*c*, by providing a space due to the pipe fitting hole 106 in the center part of the intermediate shaft part 95*c*, the left/right rigidity is further decreased. By making the up/down length Lb of the join part with the base part 95*b* in the intermediate shaft 95*c* longer than the up/down length La of the join part with the shaft tip part 95*a*, and adopting a trapezoidal shape, the up/down rigidity is maintained. By forming the join parts between the intermediate shaft part 95*c* and shaft tip part 95*a*, and between the intermediate shaft part 95*c* and base part 95*b* as curved surfaces, stress is mitigated. Further, by providing the space in the intermediate shaft part 95*c*, lubricating oil is supplied to the roller bearing 97 from the first lubricating oil passage 100 by the lubricating oil supply pipe 105 connected to the first lubricating oil passage 100 without preventing deformation of the intermediate shaft part 95*c* in the direction perpendicular to the trunnion gyration axis and the power roller rotation axis.

The tape sliding part A of the trunnion 17*a* and base part 95*b* has a very small inclination, as shown in FIG. 12. Due to this inclination, the thrust force is split into a perpendicular force and a horizontal force relative to the inside surface, and due to the horizontal force, the inner wheel supporting shaft 95 moves towards the output disk 18*b*. When the trunnion 17*a* is assembled in the unit, the four trunnions 17*a*, 17*b*, 27*a*, 27*b* are respectively housed in positions which are balanced. At this time, the four trunnions 17*a*, 17*b*, 27*a*, 27*b* are assembled in positions in contact with the output disks 18*b*, 20*b* without the intermediate shaft part 95*c* of the inner wheel supporting shaft 95 deforming towards the output disks 18*b*, 20*b*.

Therefore, the assembly position of the power roller 18*c* no longer shifts towards the side on which the intermediate shaft part 95*c* of the inner wheel supporting shaft 95 deforms due to the torque input, so the deformation amount in the state up to when the maximum input torque acts, can be suppressed. In other words, the decrease of rigidity of the intermediate shaft part 95c which is the low rigidity part of the inner wheel supporting shaft 95 can be suppressed to the absolute minimum necessary, the stress generated can be suppressed, and durability is improved.

The contents of Tokugan Hei 11-350007, with a filing date Dec. 9, 1999,and Tokugan 2000-334785, with a filing date Nov. 1, 2000, are hereby incorporated by reference.

The embodiments of this invention in which an exclusive property or privilege is claimed are defined as follows:

What is claimed is:

1. A toroidal continuously variable transmission comprising:
    an input disk and an output disk disposed facing each other on a common axis,
    power rollers provided so that it can transmit engine torque between these input/output disks,
    press member disposed at the rear of one of the input disk and the output disk which presses in the direction of the other disk, and
    trunnions which support the power roller free to rotate and is able to gyrate around a gyration axis perpendicular to a rotation axis of the power roller, wherein:
    the trunnions support the power rollers, so that they support a thrust force acting in the power rollers rotation axis direction and a traction force acting in the gyration axis direction,
    the each of power rollers comprises a power roller inner wheel in frictional contact with the input/output disks, a power roller outer wheel supported in the trunnion, a ball bearing interposed between the power roller inner wheel and the power roller outer wheel, and an inner wheel supporting shaft which supports the power roller inner wheel such that it is free to rotate, the shaft having a shaft base part provided in the trunnion, and arranged so that the radial support rigidity is set high in the gyration axis direction and set low in the direction perpendicular to the trunnion gyration axis and the power roller rotation axis, and
    when one of the disks is pressed and displaced in the direction of the other disk by a press member, the power roller inner wheel displaces with the ball bearing by the displacement of the one of the disks.

2. A toroidal continuously variable transmission as defined in claim 1, wherein the inner wheel supporting shaft comprises a shaft tip part which supports the power roller inner wheel, the shaft base part formed in one piece with the trunnion and an intermediate shaft part between the shaft tip part and shaft base part, and the radial support rigidity is set high in the gyration axis direction and set low in the direction perpendicular to the trunnion gyration axis and the power roller rotation axis by making the width in the direction perpendicular to the trunnion gyration axis and the power roller rotation axis of the intermediate shaft part narrow.

3. A toroidal continuously variable transmission as defined in claim 1, wherein the power roller outer wheel is formed as one molded component with the trunnions.

4. A toroidal continuously variable transmission as defined in claim 1, wherein the inner wheel supporting shaft comprises a shaft tip part which supports the power roller inner wheel, the shaft base part formed in one piece with the power roller outer wheel, and an intermediate shaft part between the shaft tip part and the shaft base part, and the radial support rigidity is set high in the gyration axis direction and set low in the direction perpendicular to the trunnion gyration axis and the power roller rotation axis by making the width in the direction perpendicular to the trunnion gyration axis and the power roller rotation axis of the intermediate shaft part narrow.

5. A toroidal continuously variable transmission as defined in claim 4, wherein the shaft base part of the inner wheel supporting shaft is a member which restricts motion of the inner wheel supporting shaft in the gyration axis direction and does not restrict motion of the inner wheel supporting shaft in the direction perpendicular to the trunnion gyration axis and the power roller rotation axis relative to the trunnions.

6. A toroidal continuously variable transmission as defined in claim 5, wherein the shaft base part of the inner wheel supporting shaft is a member which receives a thrust in the direction of the disk on the opposite side to the disk to which a pressing force is input when the force of the press member is input.

7. A toroidal continuously variable transmission as defined in claim 4, wherein an oil passage for lubricating a bearing interposed between the power roller inner wheel and inner wheel supporting shaft comprises a lubricating oil supply pipe which is a different component from the trunnion and inner wheel supporting shaft, and this lubricating oil supply pipe is a member which is supported by engaging with the trunnions and the shaft tip part of the inner wheel supporting shaft.

8. A toroidal continuously variable transmission as defined in claim 4, wherein an oil passage for lubricating a bearing interposed between the power roller inner wheel and inner wheel supporting shaft comprises a lubricating oil supply pipe which is a different component from the trunnion and inner wheel supporting shaft, this lubricating oil supply pipe is a member which is supported by engaging with the trunnions and the shaft tip part of the inner wheel supporting shaft, and there is a gap between the lubricating oil supply pipe and the lubricating oil passage provided in the trunnions.

9. A toroidal continuously variable transmission as defined in claim 4, wherein an up/down length of a join part of the shaft base part is greater than the up/down length of a join part of the shaft tip part in the intermediate shaft part.

10. A toroidal continuously variable transmission as defined in claim 9, wherein the intermediate shaft part of the inner wheel supporting shaft has a shape such that a bearing interposed between the power roller inner wheel and inner wheel supporting shaft does not fall out.

11. A toroidal continuously variable transmission as defined in claim 4, wherein a left/right width of a join part of the shaft base part is less than a left/right width of a join part of the shaft tip part in the intermediate shaft part.

12. A toroidal continuously variable transmission as defined in claim 4, wherein a left/right width of the intermediate shaft part is less than a left/right width of the shaft base part and shaft tip part.

13. A toroidal continuously variable transmission as defined in claim 4, wherein a curvature radius of a join part between the shaft base part and intermediate shaft part is set smaller than a curvature radius of a join part between the shaft tip part and intermediate shaft part.

14. A toroidal continuously variable transmission as defined in claim 4, wherein a hole is provided in the power roller rotation axis direction in the intermediate shaft part.

* * * * *